W. HART.
Sewing Machine.
No. 50,469.  Patented Oct. 17, 1865.
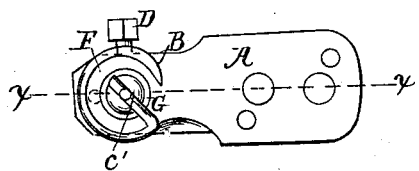
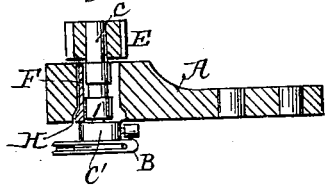
Witnesses.
Inventor.

UNITED STATES PATENT OFFICE.

WILLIAM HART, OF SAND LAKE, NEW YORK.

IMPROVEMENT IN SEWING-MACHINES.

Specification forming part of Letters Patent No. 50,469, dated October 17, 1865.

*To all whom it may concern:*

Be it known that I, WILLIAM HART, of Sand Lake, in the county of Rensselaer and State of New York, have invented a new and useful Improvement in Sewing-Machines; and I do hereby declare that the following is a full, clear, and exact description thereof, which will enable those skilled in the art to make and use the same, reference being had to the accompanying drawings, forming part of this specification, in which—

Figure 1 represents the lower needle and its bracket of a Grover & Baker sewing-machine. Fig. 2 is a sectional view on the line $x$ of Fig. 1. Fig. 3 is a detached view of the bushing which I apply to the needle-shaft.

Similar letters of reference indicate like parts.

The object of this invention is to improve that class of sewing-machines in which a rotating hook or needle is used; and it consists in placing a bushing loosely about the shaft of such hook or needle so as to compensate for the wear of the shaft, the bushing being so made that any decrease in the diameter of the shaft and any enlargement of the bushing can be compensated by compressing the bushing.

In machines of this class the constant rotation of the hook or needle, or, as in the Grover & Baker sewing-machine, the oscillation of the hook causes, the shaft of such hook or needle and its bearing to become worn away, so that the shaft and its hook or needle acquire a wabbling motion, and the hook or needle consequently fails oftentimes to take the loop of the upper thread. Whenever this takes place it becomes necessary to repair the parts that are worn, and very often it is necessary to replace the stand or bracket. My invention is meant to relieve these parts from the effects of wear, and to keep the shaft of the hook or needle in its true position and adjustment with regard to the upper needle, so that there will not be any failures to take the loop.

A designates a stand or bracket for carrying the shaft of the lower needle. This bracket is perforated to receive the shaft of the hook or needle, and, according to the present construction, the shaft is passed through it and is kept in place by means of the hub C', to which the needle is fixed, and also by means of the pinion E, through which motion is given to the needle. I also pass the shaft through the bracket, but I interpose between the shaft and the bore of the bracket, and within the latter, a bush, F, composed of a split tube. This tube thus surrounding the shaft has an enlarged rim, H, which sets in a countersink on the edge of the perforation in the bracket, and prevents the tube from settling too deep in the perforation.

The letter G designates the vertical space between the edges of the split of the tube, whereby I am enabled to compensate for the wear of the shaft C and of the bush. D is a set-screw passing through one side of the bracket and reaching to the bush. When the shaft has worn loose in the bush the screw is turned until pressure enough is produced on the bush to compress it and make it embrace the shaft more closely, the space G allowing its diameter to be reduced until the edges of the tube meet.

I claim as new and desire to secure by Letters Patent—

The application to the shafts or spindles of the lower needles or hooks of sewing-machines of adjustable bushes constructed and applied substantially as described and shown.

WM. HART.

Witnesses:
FREDERICK HACK,
J. P. KIDDER.